(12) United States Patent
Doty

(10) Patent No.: US 6,955,044 B1
(45) Date of Patent: Oct. 18, 2005

(54) REACTION ARRANGEMENT FOR BRAKE BOOSTER

(75) Inventor: Gary L. Doty, Berring Springs, MI (US)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 10/711,047

(22) Filed: Aug. 19, 2004

(51) Int. Cl.[7] ............................................. F15B 9/10
(52) U.S. Cl. .................................. 60/369.2; 60/376 R
(58) Field of Search ...................... 60/369.1, 369.2, 60/376 R

(56) References Cited

U.S. PATENT DOCUMENTS

| | | | |
|---|---|---|---|
| 4,778,225 A | 10/1988 | Rudolph | |
| 5,096,267 A | 3/1992 | Volz | 91/369.1 |
| 5,176,433 A | 1/1993 | Byrnes | 91/369.3 |
| 5,312,173 A | 5/1994 | Rossigno | |
| 5,772,290 A | 6/1998 | Heibel | |
| 5,845,556 A | 12/1998 | Tsubouchi | 91/376 R |
| 5,845,558 A | 12/1998 | Tsubouchi | |
| 6,065,388 A * | 5/2000 | Tsubouchi et al. | 91/369.2 |
| 6,295,916 B1 | 10/2001 | Horner | 91/376 R |

* cited by examiner

Primary Examiner—Thomas E. Lazo
(74) Attorney, Agent, or Firm—Leo H McCormick, Jr.; Warren Comstock

(57) ABSTRACT

A reaction arrangement for a brake booster having a control valve selectively activated by a manual input force or an electromagnetic force to allow air to create a pressure differential with vacuum and produce an output force that is transmitted through an output member in effecting a brake application. The output member encounters resistance during the brake application that is defined by a reaction force transmitted through a disc. A first shaft engages the disc and communicates the reaction force to balance the manual input force while a second shaft engages the disc and communicates the reaction force to balance the electronic force such that a resulting output force to effect a brake application is similar whether initiated by an operator or an electronic control unit.

11 Claims, 5 Drawing Sheets

REACTION ARRANGEMENT FOR BRAKE BOOSTER

BACKGROUND OF INVENTION

This invention relates to a reaction arrangement for use in a brake booster to selectively communicate a first reaction force to balance a manual input force or a second reaction force to balance an electromagnetic input force to effect a brake application.

Vacuum brake boosters having a manual mode of operation and an electronic mode of operation are known in the prior art as evidenced by structure disclosed in U.S. Pat. Nos. 4,778,225; 5,096,267; 5,176,433 and 5,312,173 relating to the addition of traction control to a brake system and U.S. Pat. Nos. 5,226,173; 5,845,558; 5,772,290 and 6,065,388 relating to emergency braking features for a brake system. The structure in such brake systems functioned in an adequate manner for a purposed purpose at the time of such inventions however with the introduction of sway control features to a brake system such brake systems did not operate in a manner to provide for acceptable control of a brake system by an operator. For instance in some of the brake boosters having an emergency braking features, once an emergency brake application was initiated, the operator was prevented from intervening in the brake application unless the input force that initiated the emergency brake application was removed from a brake pedal. In U.S. Pat. Nos. 5,556,173 and 6,375,282 specific software and a switch activated by a brake light switch are disclosed to terminate an automatic braking. The shift in control of the operation of a brake booster is enhanced by the structure disclosed in U.S. patent application Ser. No. 10/645,206 filed Aug. 21, 2003 wherein an immediate transfer from an electronic actuation of a control valve to a manual actuation occurs so that the operation of the brake booster is under the control of an operator. While this brake booster functions in an adequate manner, the force required to initiate and sustain a brake application in response to a manual mode and an electronic mode is substantially the same and as a result, the size of an electromagnet member required to sustain an input force sufficient to oppose a reaction force corresponding to a desired brake application is relative large as compared to a size needed to activate a control valve.

SUMMARY OF INVENTION

A primary object of the present invention is to provide a brake booster with a reaction arrangement whereby a first reaction force corresponding to a manual force applied to a brake pedal is utilized in effecting a first brake application and a second reaction force corresponding an input from an electromagnetic member under the control of an electronic control unit is utilized to effect a second brake application such that the first and second braking applications have similar output forces.

According to this invention, a brake booster has a housing with an interior that is separated into a front chamber and a rear chamber by a wall arrangement. The wall arrangement has a hub with a first end located in the front chamber and a cylindrical body that extends through the rear chamber and into the surrounding environment. A cylindrical body has axial bore therein for retaining a control valve that controls communication of a first fluid (vacuum) between the front chamber and rear chamber in a first mode of operation and controls communication of a second fluid (atmospheric air) between the rear chamber and the surrounding environment in a second mode of operation. In the second mode of operation, a pressure differential that is created across the wall arrangement develops an output force that is communicated through an output member that acts on pistons in a master cylinder to product operational fluid pressure to effect a brake application. The control valve is selectively actuated from the first mode of operation to the second mode of operation in response to a first input force applied to a brake pedal or in response to a second input force developed by an electromagnetic member under the control of an electronic control unit. The output member encountering resistance to the movement of the pistons in the master cylinder during a brake application that is communicated through a reaction arrangement as a reaction force to balance the first and second input forces. The reaction arrangement is characterized by a disc member that is located between first end of the hub and the output member to receive the reaction force. A first shaft is connected to the disc member and communicates the reaction force to balance a first input force applied to a brake pedal and supplied by the first input member to activate the control valve. A second shaft is connected to the disc member and communicates the reaction force to balance a second input force supplied by the electromagnetic member to activate the control valve. A resulting output force from both the first input member and electromagnetic member results in first and second braking applications that have similar stopping profiles.

An advantage of this invention resides in a brake booster having the capability of responding to a manual input force and an electromagnetic input force wherein stopping profile during a brake application are similar.

A further advantage of this invention resides a brake booster having a reaction arrangement with independent means for communicating a reaction force to a manual actuation member and an electromagnetic member such that a similar braking profile make be achieve to effect a brake application.

DETAILED DESCRIPTION

In this application identical components may be identified by a same number plus ' located at more than one location within a component.

Figure 1:
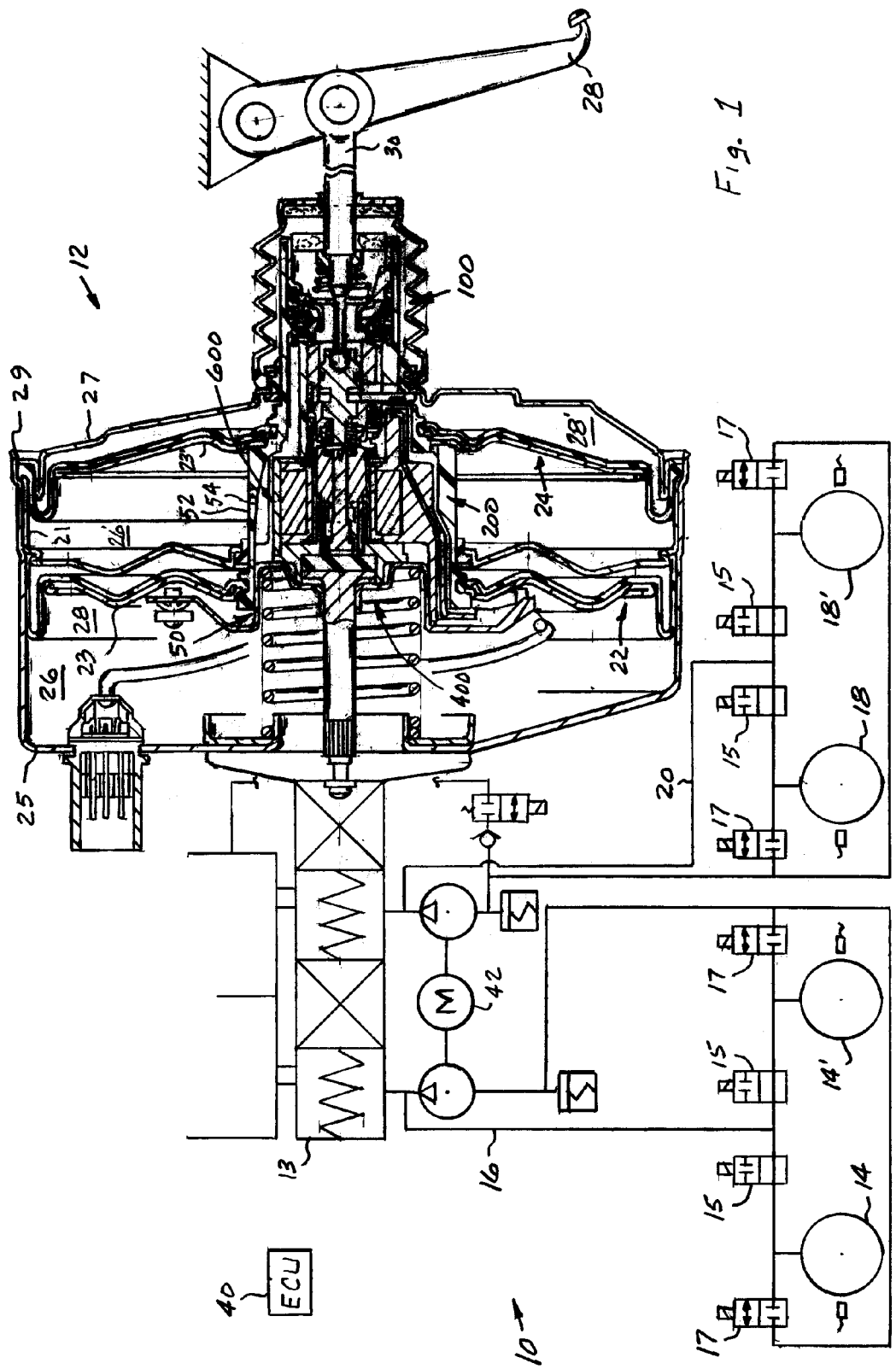
FIG. 1 is schematic illustration of a brake system having a vacuum brake booster with a reaction arrangement according to the teachings of the present invention.

The brake system 10 as shown in FIG. 1 includes a vacuum brake booster 12, made according to the present invention, for supplying a master cylinder 13 with an operational force to pressurize fluid that is supplied to a first set of wheel brakes 14,14" by a first conduit 16 and to a second set of wheel brakes 18,18" by a second conduit 20 to effect a brake application. Vacuum brake booster 12 is similar to a type of brake booster disclosed in U.S. patent application Ser. No. 10/645,206 filed Aug. 21, 2003, in that a manual force applied is through a brake pedal 28 to move an input rod assembly 30 that is connected operated control valve 100 and to develop an operational force for effecting a first brake application or an electromagnetic force that is generated through a solenoid 200 that is actuated in response to a signal received from an electronic control member (ECU) 40 to operate the control valve 100 and independently effect a second brake application but differs in a manner in which a reaction force is communicated through a reaction arrangement 400 to balance the manual force and electromagnetic force to achieve a desired brake profile during a brake application.

The second brake application is exclusively under the control of the ECU 40 and uses structure associated with a wheel lock assembly in the brake system 10 to selectively provide individual wheel brakes with pressurized fluid from master cylinder 13 to achieve a desired brake application. The wheel lock assembly is designed to attenuate the rotation of a wheel when rolling on a surface and decelerating from a first speed to a second speed when a wheel lock may occur during a brake application and also to provide for traction control and sway control features in the brake system 10.

The wheel lock assembly as illustrated in FIG. 1 includes among other components: an electric motor pump 42; and a build solenoid valve 15, a decay solenoid valve 17, and a wheel speed sensor 19 for each wheel in the first set of wheel brakes 14,14" and in the second set of wheel brakes 18,18". The wheel speed sensor 19 for each wheel provide the electronic control unit (ECU) 40 with input signals relating to current information or data of the functional operational of the vehicle. The ECU 40 also receives and evaluates other signals relating to the current operation of the vehicle including but not limited to: the operation of the motor pump 42; the pressure of the pressurized supply fluid; dynamic forces experienced by the vehicle; accumulator fluid supply pressure; the level of fluid in a reservoir; deceleration and deceleration forces and other inputs that relate to the operation of the vehicle that may effect the safe operation of a vehicle.

The vacuum brake booster 12 includes a housing that is formed by joining a front shell 25 to a rear shell 27 through a locking arrangement 29. A partition arrangement 21 similar to a type disclosed in U.S. Pat. No. 3,897,718, is located in the housing and connected to a hub 50 while movable walls 22 and 24 separate the interior of the housing into front 26,26" and rear 28,28" chambers. The movable walls 22 and 24 each have a correspondingly diaphragm and backing plate assembly 23,23" that are fixed to the peripheral surface 52 of hub 50. The hub 50 has a cylindrical body 54 with a stepped axial bore 55 therein that extends from a first end 56 located in the front chamber 26 to a second end 58 which passes through the rear shell 16 and is located in a surrounding environment. Hub 50 has a first series of passageways 60,60" through which the front chambers 26,26" are permanently connected to each other upstream of a vacuum seat 62 and a second series of passageways 61,61" through which the rear chambers 28,28" are selectively connected to each other downstream of the vacuum seat 62 located in the cylindrical body 54 on movement of the control valve 100 by either a manual input from brake pedal 28 hereinafter defined as a first input member or automatically by an electromagnetic force produced by solenoid 200 hereinafter defined as a second input member 600.

When the control valve assembly 100 is under the control of the ECU, switch means 202 retained in hub 50 provides the ECU 40 with an initial first signal confirming the development of a second brake application. Should an operator later desire to effect a first brake application, switch means 202 provides the ECU 40 with a second signal on movement of the control valve assembly 100 by first input member 30 and the electrical input to the solenoid 200 is terminated such that the operation of the vacuum brake booster 12 under the control of the operator and is responsive to a manual input applied to the first input member 30.

In more detail, the control valve assembly 100 is defined by a cylindrical member 501 that functions as a poppet and is sealingly located in the axial bore 55 of cylindrical body 54 of hub 50. The cylindrical member 501 has an annular face 502 on a first end 504 with a portion thereof that functions as an atmospheric seat 506 and first 508 and second 510 flexible radial lips that extend from a second end 512. A retainer 514 that is fixed to the end 58 of the cylindrical body 54 of hub 50 has a body 515 with a first annular cylindrical surface 516 that is separated from a concentric second annular cylindrical surface 518 by a shoulder 520. The first lip 508 on cylindrical member 502 sealingly engages cylindrical surface 516 and the second lip 510 on the cylindrical member 502 sealingly engages cylindrical surface 518 on retainer 514 to hold face 502 in a perpendicular alignment with the axial bore 55 of hub 54.

A first spring 522 is located in axial bore 55 between a shoulder on retainer 514 and cylindrical member 501 to urge the annular face 502 thereon toward a seat 62 associated with passage 60 in hub 50 through which chamber 26 is connected to chamber 28 by way of axial bore 55.

A first plunger 532 that includes a first shaft 534 and a second shaft 550 is located in the axial bore 55 of cylindrical body 54 of hub 50. The first shaft 534 has a first land or diameter 536 adjacent a first end 538, a second land or diameter 540 adjacent a second end 542 and a third land or diameter 544 that is located between the first land 536 and third land 544 to define a groove 546. End 538 of the first shaft 534 has a bore 547 for receiving a head 31 on a push rod 33 of the first input member 30 while end 542 has a flat surface for engaging the second shaft 550. The second shaft 550 has as first end 552 and a second end 556 with a peripheral surface having a first diameter 558 separated from a second diameter 560 by a shoulder 561. The second diameter 560 engages a bearing surface 59 in hub 50 to hold the second end 556 in alignment with reaction disc 224 and output rod 422 connected to master cylinder 13 and the first end 552 in axial alignment with the second end 542 on the first shaft 534.

A second cylindrical member 562 that includes a stepped bore 564 that extends from a first end 566 to a second end 572 is located in axial bore 55 of cylindrical body hub 54 of hub 50. The first end 566 has a tapered face 568 thereon to define an atmospheric or second seat 570 while a second end 572 has a lip 574 thereon. The cylindrical member 562 further includes a radial slot 576 that is located between a first shoulder 578 and a second shoulder 580, the radial slot 576 has a linear length the larger than a radial slot 49 in the cylindrical body 54 of hub 50 plus a length defined by a lap gap for the control valve assembly 100 and an internal rib 582 located in the stepped bore 564 adjacent the second end 572 that functions as an abutment surface for shoulder 539 on the first plunger 532 through which the first input force is applied to move the second cylindrical member 562. The first 536 and third 544 diameters of the first shaft 534 engage the stepped bore 564 and as a result the plunger 532 is maintained in axial alignment with in axial bore 55 of the cylindrical body 54 of hub 50.

A second spring 586 has an end that engages surface or shoulder 47 in axial bore 55 and an end that engages shoulder 578 on the second cylindrical member 562 for urging the first end 566 and associated tapered atmospheric seat 570 of the second cylindrical member 562 toward the annular face 502 on the first cylindrical member 501.

A key 150 that includes first and second legs 151 (only one is shown) is retained in cylindrical body 54 of hub 50 as the legs 151 extend through slots 49 (only one is illustrated) in cylindrical body 454, through slots 576 (only one is illustrated) in the second cylindrical member 562 and groove 546 in the first plunger 532. The slots 49 in cylindrical body 54, slots 576 in the cylindrical member 562 and groove 546 limit the axial movement of the first plunger 532 in axial bore 55 of the cylindrical body 54.

A third spring 590 that is located in axial bore 55 has a first end located on shoulder 520 on retainer 514 and a second end located on push rod 33 for urging the first plunger 532 toward retainer 514. In the first mode of operation, return spring 240 acts on hub 50 and when key 150 engages the rear shell 27, face 441 on the third land 536 of the first plunger 532 engages key 150 to hold the first plunger 532 in a stationary position while the cylindrical body 54 continues to move by way of slots 49 until the bottom of slots 49 engages key 150 at which time the second spring 586 will have moved the tapered atmospheric seat 570 into engagement face 502 on the first cylindrical member 501 such that the first chamber 26,26' is connected with second chamber 28,28'. Thus, the atmospheric seat 570 is resiliently retained on face 502 while the force of the third spring 590 is selected such a gap may be present between face 502 on the first cylindrical member 501 and the vacuum seat 62.

A second plunger 601 which is part of solenoid 200 of the second input member 600 has a cylindrical body 603 which is located in the axial bore 54 and loosely surrounds diameter 558 on the second shaft 550. The cylindrical body 603 has a groove 604 on a first end for receiving lip 574 on the second cylindrical member 562 to form a link that secures the second plunger 601 with the second cylindrical member 562. The cylindrical member 603 has a face 602 adjacent a projection 604 on a second end that is parallel with a shoulder 45 in the axial bore 55 of cylindrical body 54 of hub 50 that is designed to receive an independent and separate reaction force from the reaction arrangement 400 assembly during a brake application under the control of the ECU 40.

The coil of solenoid 200 is concentric to the cylindrical body 603 of the second plunger 601 is retained in axial bore 54 of the cylindrical body 54 of hub 50. The coil of solenoid 200 is connected to the ECU 40 and on receipt of an electrical input indicating a traction control event is desirable to control the vehicle operation, a force is produced by the electric current attempting to center the cylindrical body 603 within the coil such that second cylindrical member 562 and atmospheric seat 570 correspondingly move away from face 502 on the first cylindrical member 501 such that after face 502 is seated on vacuum seat 62 communication through passage 60 to the second chamber 28 is terminate and air to be communicated to the second chamber 28 through the second passage to initiate the second mode of operation of the brake booster 12 in effecting a brake application.

A switch 700 has a sensor 702 that is retained in the cylindrical body 54 of hub 50 and an exciter element 704 attached to key 150. The sensor 702 is of a passive type such as a Hall effect, AMR or GMR device that is activated by a magnetic field coupling while the exciter element 704 is a magnet. A change in a relationship between the sensor 702 and exciter element 704 defining a signal that is communicated to the ECU 40. During a first brake application resulting from a manual input being applied to the first plunger 532, the relationship between the sensor 702 and exciter 704 does not have any effect in effecting a brake application. However, should the ECU 40 determine that a vehicle operation may be enhance through a second brake application when an electrical input is provided to solenoid 200 to operate the control valve assembly 100 the sensor 702 is also activated. When the second plunger 601 has moves the second cylindrical member 562 such that atmospheric seat 570 is away from face 502 and a pressure differential acts on wall 40 to move hub 50 on initial movement sensor 702 moves away from exciter 704 to supply the ECU 40 with a signal indicating that a second brake application has been initiated. In this second brake application, key 150 remains against the rear of slot 49 as the return spring 590 acts on input push rod 33 to hold the first plunger 532 against key 150 and as a result the first plunger 432 remains stationary with respect to the cylindrical body 54 and the relationship between the sensor 702 and exciter 704 remains constant during this second brake application. The second brake application remains in effect and under the control of the ECU until sensor associated with measuring the operation of the vehicle indicate a safe operation may be achieved. Should an operator desire to effect a first brake application during this second brake application, a manual input applied to push rod 33 overcomes the force of spring 590 and moves face 537 on the land 536 into engagement with key 150 and thereafter moves key 150 in slot 49,49 to position exciter 704 adjacent sensor 702 to create a second signal that is communicated to the ECU 40 indicating an operator desires to take control of the braking of the vehicle. Once the ECU 40 receives this second signal, the electrical input to the coil of solenoid 200 is immediately terminated and the braking of the vehicle is under the control of the first input member as a function of the force applied to the input push rod 33.

Figure 2:
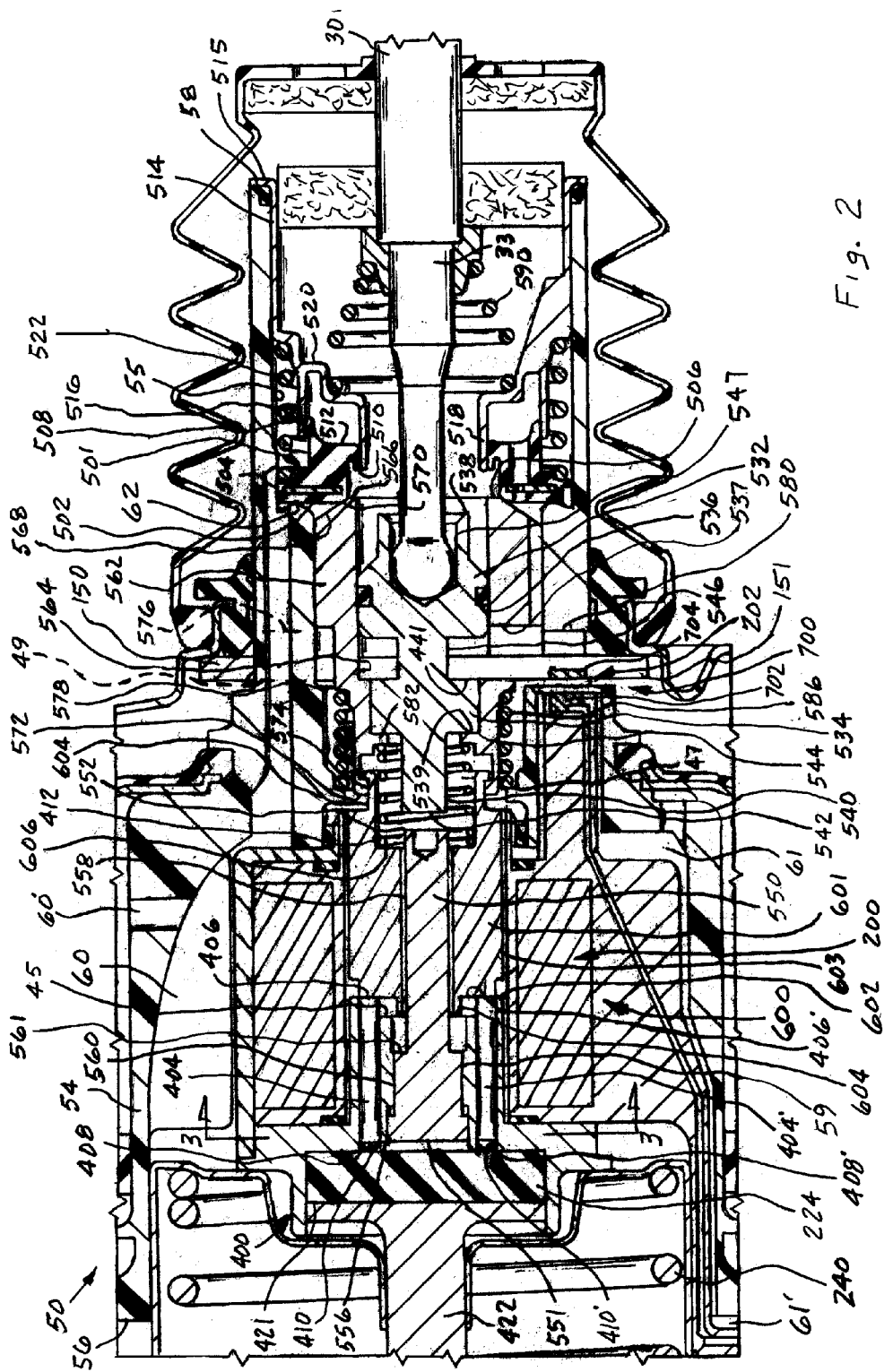
FIG. 2 is an enlarged sectional view of the reaction arrangement of FIG. 1.
Figure 3:
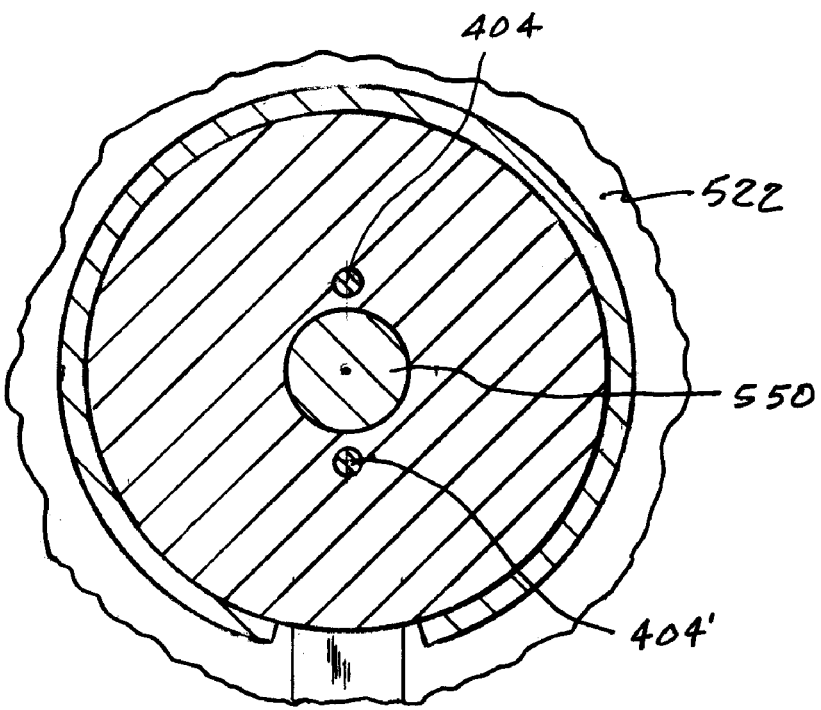
FIG. 3 is a sectional view taken along lines 3—3 of FIG. 2.

The development of a brake application corresponding to a desired input applied to brake pedal 28 occurs when a balance occurs between a reaction force created by a resistance of an output force transmitted by output member 422 to pressurize fluid in the master cylinder matches the input force applied to the brake pedal. The reaction force is communicated through reaction arrangement 400 and includes output member 422, reaction disc 224 and pins or shaft 404,404' that is located in cylindrical body 54 of hub 50, see FIG. 3. Pins 404,404' each have a first end 406 that engages face 602 on the second plunger 601 and a second end 408, as best illustrated in FIG. 2. The second end 408 has a semi-spherical face 410 that engages the reaction disc 224 and is urged by the spring force of spring 412 retained between shoulder 582 on the second cylindrical member 562 and shoulder 606 on the second plunger 601 of solenoid 200 into the reaction disc 224. In addition to attenuating the creation of noise by components that may be loosely retained in a housing, force of the spring 412 moves the reaction pins 404,404' into the reaction disc 224 during the actuation of the control valve 10 when under the control of the ECU.

Mode of Operation

The vacuum brake booster 12 for brake system 10 of FIG. 1 is illustrated in a position of rest. When an operator desires to effect a brake application and thereby reduce the speed or stop a vehicle, an input force is applied to brake pedal 28 that moves push rod assembly 30 in a linear manner to move plunger member 532 and the control valve assembly 100 which may be activated by either a manual input develop an output force 101, see FIG. 6, to effect a first brake application or may be activated by an electromagnetic force developed by solenoid 200 in response to a signal from ECU 40 to develop an output force 201, see FIG. 6, to effect a second brake application.

Figure 4:
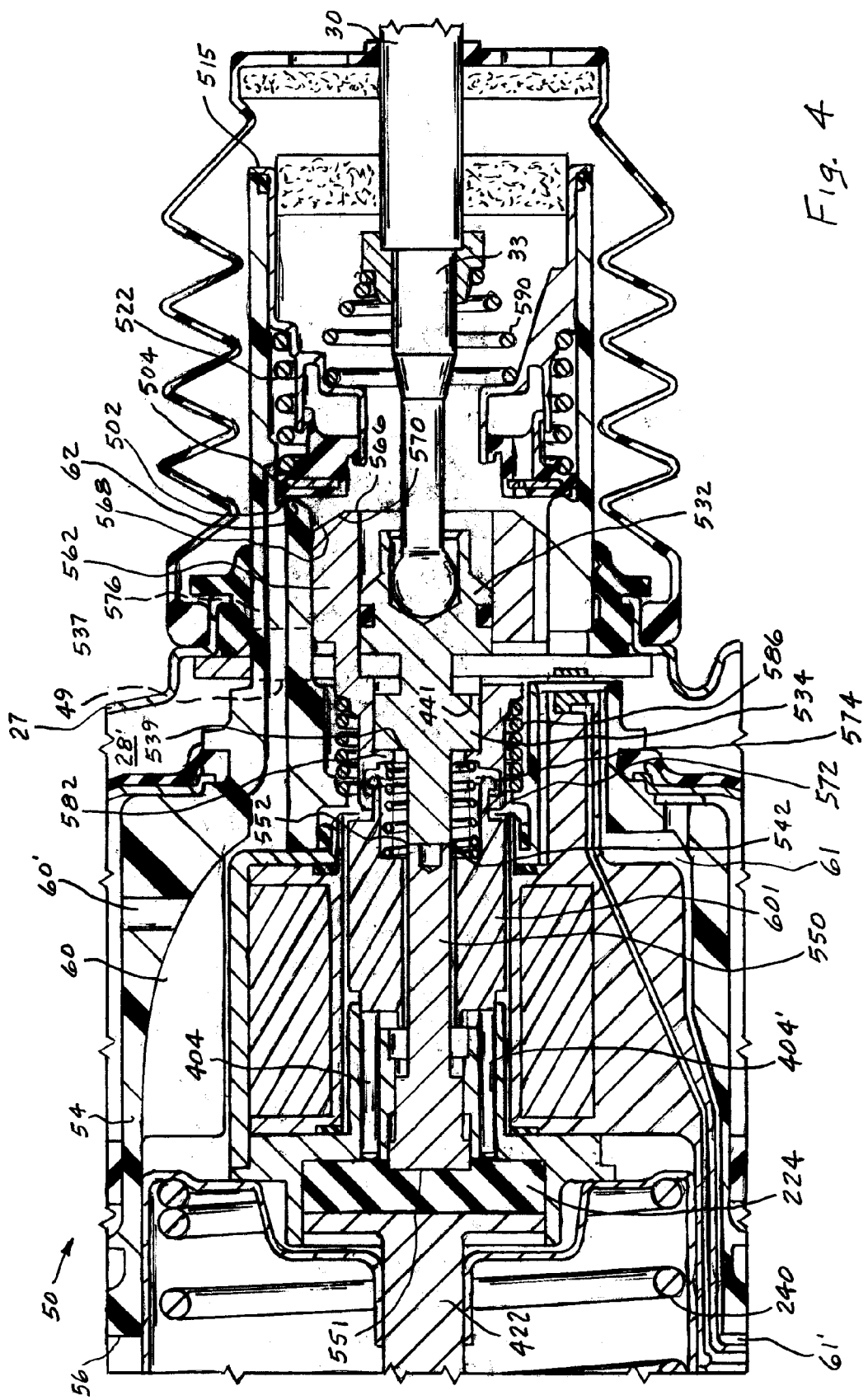
FIG. 4 is an enlarged sectional view of reaction arrangement for the brake booster in a power assist mode of operation corresponding to a manual input.

The first brake application of brake booster 12 is under the control of the operator and is in response to a manual input applied to brake pedal 28 which after the force of return spring 590 acts through input member 33 to move plunger 532 and activate the control valve assembly 100. The plunger 532 is moved such that shoulder 539 on the third land 540 of the first plunger 532 engages rib 582 on the second cylindrical body 562 to move atmospheric seat 570 away from face 502 while at the same time spring 522 moves face 502 against seat 62 to terminate communication between chambers 26,26' and chambers 28,28' and thereafter allow air to enter into chamber 28,28' to create a corresponding pressure differential across wall 40, as illustrated in FIG. 4. The resulting pressure differential acts on wall 40 and an output force is carried through hub 50 by way of reaction disc 242 to act on output member 422 and move pistons in master cylinder 13 to effect a brake application. Resistance to movement of the pistons in the master cylinder creates a reaction force that opposes the output force and as a result the reaction disc 242 is compressed between the hub 50 and face 421 on the output member 422. Compression of the reaction disc 224 causes the reaction disc 224 to flow into the axial bore 55 of the cylindrical body 54 and acts on end 551 of the second shaft 550 and end 542 of the first shaft 536 to oppose the input force applied to push rod 33, see FIG. 4. When the reaction force exceeds the input force, the reaction force moves the first plunger 532 such that the second spring 590 repositions the second cylindrical member 562 on atmospheric seat 570 on face 502 to terminate communication of air to the second chamber 28 to achieve a balance between the output force developed by the pressure differential and the input force applied to brake pedal 28. On termination of input force on push rod 33 to treminate a brake application, spring 590 acts on push rod 33 and spring 586 holds the second the atmospheric seat 570 on cylindrical member 562 against face 502 of the first cylindrical member 501 such that face 502 may move away from vacuum seat 62 to allow the pressure in the rear chamber 28,28' to equalize with the pressure in chamber 26,26'. Thereafter, return spring 240 acts on the hub 50 to move the wall 40 toward the rear chamber 28,28' such that when key 150 engages the wall of the rear shell 27 and when face 539 on the third land 542 engages key 150 the movement the first plunger 532 stops while the cylindrical body 54 continues until the bottom of slot 49 engages key 150 to define the rest or first mode of operation for the vacuum booster 12 as illustrated in FIG. 2.

Figure 5:
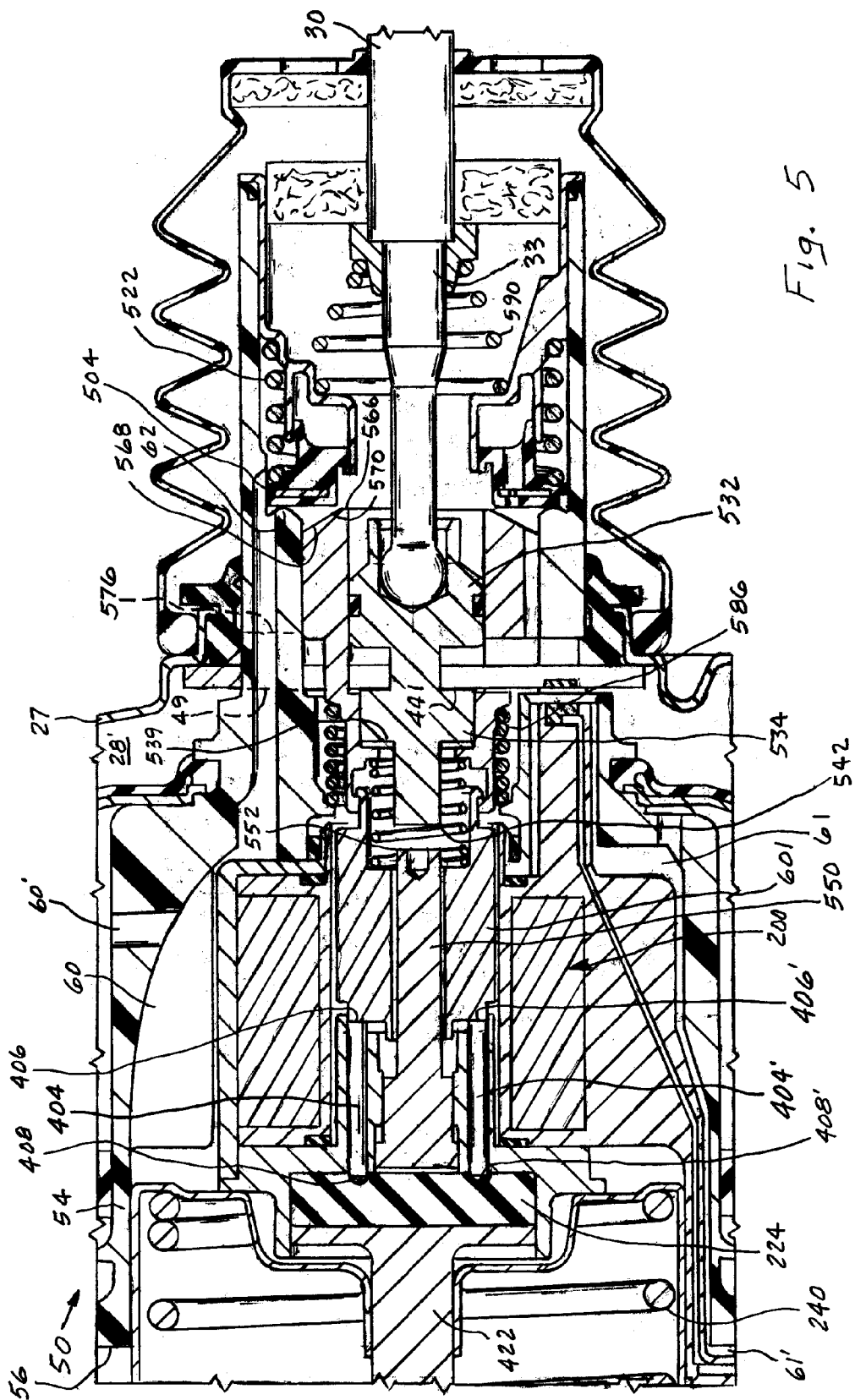
FIG. 5 is an enlarged sectional view of the reaction arrangement for the brake booster in an automatic mode of operation under the control of an Electronic Control Unit.

When the ECU 40 determines that a second brake application is desirable to maintain a desired operation of the vehicle, the ECU 40 sends an electrical signal activate the coil of solenoid 200 and to sensor 702 in switch 700. The electrical signal energized the coil in solenoid 200 to center the second plunger 601 with respect to the coil of solenoid 200. As the second plunger 601 moves toward the center of the coil, the pins 404 are moved such the ends 410 are moved into the reaction disc 224 to control the initial movement of the second plunger 601 and correspondingly cylindrical member 562 is moved by the engagement of shoulder 605 on groove 603 on cylindrical body 603 with lip 574 to move the atmospheric seat 570 is away from face 502 on the first cylindrical member 501 such that air may enter the second chamber 28,28' and create a pressure differential across wall 40. The resistance to movement of ends 410 on pins 404,404' into reaction disc 224 results in gradual movement of the cylindrical body 562 such that air enters the rear chamber 28,28' in a manner such that a resulting pressure differential for booster 12 is proportional to the movement of the second plunger 601, see FIG. 5. The pressure differential acts on wall 40 and after overcoming return spring 240 moves hub 50 and sensor 702 away from exciter 704 that remains against the wall of the rear shell 27 by way of the force of spring 590 acting on the first plunger 532. As with the brake application developed through a manual input force applied to input rod 33, the output force derived from the pressure differential under the control of the ECU 40, acts on the hub 50 and is carried through reaction disc 224 to move pistons in master cylinder 13 and pressurize fluid therein to effect a brake application. Resistance to movement of the pistons in the master cylinder creates a reaction force that opposes the output force and as a result the reaction disc 242 is compressed between the hub 50 and face 421 on the output member 422. Compression of the reaction disc 224 causes the reaction disc 224 to act on the end 408 of shaft 404,404' and oppose the input force applied move plunger 601. When the reaction force exceeds the input force, the reaction force moves the plunger 601 such that the spring 586 acts on and repositions the second cylindrical member 562 on atmospheric seat 570 on face 502 to terminate communication of air to the second chamber 28,28' to achieve a balance between the output force developed by the pressure differential and the input force derived from the electromagnetic force of solenoid 200.

During the development of a brake application under the control of the ECU 40, when sensor 702 that is fixed to the cylindrical body 54 moves away from exciter 704 a first signal is supplied to the ECU 40 indicating that a second brake application has been initiated as confirmed by the movement of wall 40. This relationship between the sensor 702 and exciter 74 remains constant and continues during this second brake application that is under the control of the ECU 40 until sensor associated with measuring the operation of the vehicle indicate a safe operation may be achieved. Should an operator desire to effect a first brake application of the vehicle during this second brake application, a manual input is applied to push rod 33 and after overcoming the force of spring 590 and moves face 537 on the land 536 into engagement with key 150 to move key 150 in slot 49 and position exciter 704 adjacent sensor 702 to create a second signal that is communicated to the ECU 40 indicating an operator desires to take control of the braking of the vehicle. Once the ECU 40 receives this second signal, the electrical input to the coil of the solenoid 200 is immediately terminated and the braking of the vehicle is under the control of the first input member as a function of the force applied to the input push rod 33.

Figure 6:
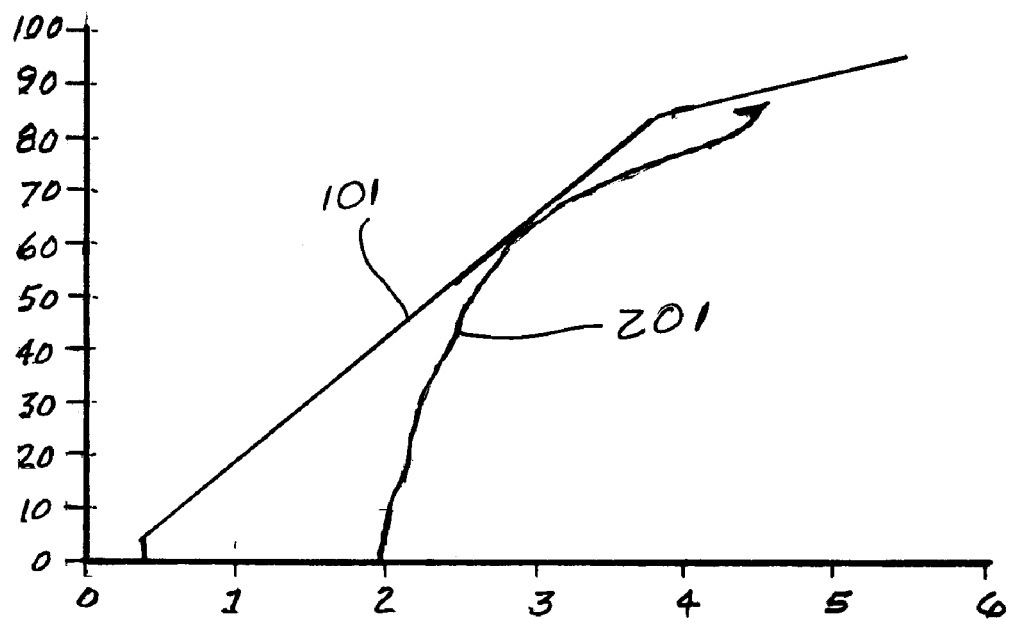
FIG. 6 is graph showing a braking profile of the output of the brake booster in a power assist mode in response to a manual input and an automatic mode under the control of the Electronic Control Unit.

In brake booster 12 the reaction force derived from a manual input force is a function of the effective area of face 551 on end 556 on the second shaft 550 and the reaction force derived from an input force under the control of the ECU 40 is a function of the effective area of the end 410 of pins or shafts 404,404'. While a reaction force generated through the resistance of pressurizing fluid in the master cylinder may be the same for both a manual input or an electromagnetic input, the use of a reaction force for each type of actuation is separate, distinct and not cumulative. The effective area of the end 410 of pins 404,404' is about ¹⁄₁₀ the effective area of the face 551 on end 556 of shaft 550 and as a result a force required to activate control valve 100 for each application is different and yet a similar result may be achieved as illustrated in FIG. 6 for an output force as illustrated by trace 101 for a manual input force or an output force as illustrated by trace 201 for an automatic brake application.

I claim:

1. A brake booster having a housing wherein an interior that is separated into a front chamber and a rear chamber by a wall arrangement, said wall arrangement having a hub with an first axial bore therein for retaining a control valve that controls communication of a first fluid between the front chamber and rear chamber in a first mode of operation and controls communication of a second fluid between said rear chamber and the surrounding environment in a second mode of operation to create a pressure differential across said wall arrangement and develop an output force that is communicated through an output member to effect a brake application, said control valve being selectively actuated from said first mode of operation to said second mode of operation in response to a first input force applied to a brake pedal and in response to a second input force developed by an electromagnetic member under the control of an electronic control unit, said output member encountering resistance during a brake application that is communicated through a reaction arrangement as a reaction force to balance said first and second input forces, said reaction arrangement being characterized by a disc member located between said hub and said output member that receives said reaction force, a first shaft connected to said disc member for communicating said reaction force to balance said first input force supplied by said first input member and a second shaft connected to said disc member for communicating said reaction force to balance said second input force supplied by said electromagnetic member such that a resulting output force is matched with a desired brake application.

2. The brake booster as recited in claim 1 wherein said reaction arrangement is further characterized by said second shaft having an effective diameter that is smaller than an effective diameter of said first shaft and as a result a reaction force necessary to balance said second input force is proportionally smaller than a reaction force necessary to balance said first input force.

3. The brake booster as recited in claim 2 wherein said control valve is characterized by a first cylindrical member located in said first axial bore and having a second axial bore that extends from a first end to a second end, an annular seat located on said first end, a lip located on a second end and an inner rib in said second axial bore; and a first plunger located in said second axial bore that is connected to said first input member, said first plunger transmitting said first input force into said inner rib to move said first cylindrical member and said seat such that said second fluid may enter said rear chamber and create said pressure differential.

4. The brake booster as recited in claim 3 wherein said electromagnetic member is characterized by a second plunger having a second cylindrical member that surrounds said first shaft with a groove that receives said lip on said first cylindrical member, said lip moving in said groove to allow said first cylindrical member to independently move with respect to said second cylindrical member.

5. The brake booster as recited in claim 4 wherein said control valve is further characterized in that engagement of said first shaft with said first plunger does not occur until said reaction force moves said first shaft to close a gap between said first shaft and said first plunger to define a solid link with said input member and thereafter balance said input force applied to the brake pedal during a brake application.

6. The brake booster as recited in claim 5 wherein said reaction arrangement is further characterized in that said second shaft is located between said disc member and said second cylindrical member and during a brake application in response to said first input force said reaction force acts on said second shaft to urge said second cylindrical member toward said first cylindrical member.

7. The brake booster as recited in claim 6 wherein said reaction arrangement is further characterized in that said second input force initially moves said second shaft from a rest position into said disc member and said reaction force returns said second cylindrical member to said rest position to balance said second input force during a brake application.

8. The brake booster as recited in claim 7 wherein said second shaft is characterized by first and second pins through which said reaction force is communicated to said second cylindrical member.

9. The brake booster as recited in claim 8 wherein said reaction arrangement is further characterized by sensor means having a first component fixed to said hub and a second component connected to said first cylindrical member to provide said electronic control unit with a signal indicating a desire to shift control of said control valve from said electromagnetic member to said first input member.

10. The brake booster as recited in claim 9 wherein reaction arrangement is characterized in that said first input force and said second input force are exclusive and not cumulative.

11. The brake booster as recited in claim 10 wherein an output force generated in response to said first input force and an output force generated in response to said second input force are similar.

* * * * *